United States Patent [19]

Shipley et al.

[11] Patent Number: 4,737,897

[45] Date of Patent: Apr. 12, 1988

[54] REGULATED HIGH VOLTAGE DC-DC CONVERTER WITH REMOTELY SWITCHED OUTPUT POLARITY CONTROL

[75] Inventors: George H. Shipley, Seminole; Frederick L. Smith, Belleair Beach, both of Fla.

[73] Assignee: Honeywell Inc., Minneapolis, Minn.

[21] Appl. No.: 924,540

[22] Filed: Oct. 29, 1986

[51] Int. Cl.⁴ .......................................... H02M 3/338
[52] U.S. Cl. ...................................... 363/19; 307/127; 361/245; 363/63; 363/71
[58] Field of Search ..................... 363/19, 16, 61, 67, 363/71, 63; 307/127; 323/267; 361/245, 246, 226, 235

[56] References Cited

U.S. PATENT DOCUMENTS

| | | | |
|---|---|---|---|
| 3,212,211 | 10/1965 | Bennett | 361/235 |
| 3,849,607 | 11/1974 | Carbrey | 361/245 |
| 3,872,370 | 3/1975 | Regnault | 361/235 |
| 4,107,756 | 8/1978 | Best et al. | 361/235 |
| 4,224,529 | 9/1980 | Fujiwara | 307/127 |

Primary Examiner—William H. Beha, Jr.
Attorney, Agent, or Firm—George A. Leone, Sr.

[57] ABSTRACT

A power supply having a dual-polarity, automatically switchable high voltage output. The power supply includes apparatus for regulating low voltage including a comparator having a programming voltage input and a feedback voltage input. The low voltage is converted by low voltage dc conversion apparatus to both negative and positive polarity high voltage dc signals proportional to the electronic signal applied to the programming input. Apparatus for switching the high voltage output by remote control is provided such that in a first switching mode the high voltage output is derived from the output of the positive polarity conversion apparatus, and in a second switching mode the high voltage output is derived from the output of the negative polarity conversion apparatus. Finally, apparatus for providing the absolute value of the high voltage output is included and provides a scaled down absolute value of the signal present at the high voltage output which is fed into the feedback voltage input of the low voltage regulator apparatus.

16 Claims, 2 Drawing Sheets

REGULATED HIGH VOLTAGE DC-DC CONVERTER WITH REMOTELY SWITCHED OUTPUT POLARITY CONTROL

BACKGROUND OF THE INVENTION

1. Field of the Invention

The present invention relates to power supplies and, more particularly, to power supplies having a remotely switchable, bipolar high voltage output.

2. Description of the Prior Art

Drift tube chemical agent point detection systems are utilized for detecting harmful chemical agents in the atmosphere. It is desirable to design such systems to be light and portable so that an operator can carry around a self-contained portable unit in the field without undue fatigue.

At the present time, most harmful chemical agents form positive ions when subjected to a Americium 241 radiation source except for lewisite which forms negative ions. In order to detect both positive and negative ions the operator of a typical detection system would have to manually switch polarities on the power supply of the detector from time to time. Thus, the operator must determine which types of ions to search for, and select the appropriate polarity.

The present invention overcomes the aforementioned shortcomings in a device requiring manual operation of polarity selection by providing automatic, remote control capability for switching polarities. The power supply of the invention enables chemical agent point detectors to automatically detect both positive and negative ion agent formation. Since the power supply of the invention can switch polarity under remote control, such a chemical agent point detector can be programmed to monitor for both types of ions on an alternating time slot basis. The present invention, therefore, relieves the operator of the responsibility of determining which type of ions to search for.

SUMMARY OF THE INVENTION

A power supply having a high voltage output is disclosed. Included in the power supply is a means for regulating low voltage including a comparator having a programming voltage input and a feedback voltage input. The low voltage regulating means also has a low voltage output. The output of the regulating means is applied to both means for converting low voltage dc to a negative polarity high voltage dc proportional to the electronic signal applied to the programming input which has an input connected to the low voltage output, and means for converting low voltage dc to a positive polarity high voltage dc which is also proportional to the electronic signal applied to the programming input which also has an input connected to the low voltage output. The output polarity is then selected by a means for switching the high voltage output by remote control such that in a first switching mode the high voltage output is derived from the output of the positive polarity conversion means, and in a second switching mode the high voltage output is derived from the output of the negative polarity conversion means. Feedback control of the power supply is achieved by a means for providing the absolute value of the high voltage output. The absolute value means includes an input, an output and further includes scaling means such that a scaled down absolute value of the signal present at the high voltage output is fed into the feedback voltage input of the low voltage regulator means.

DETAILED DESCRIPTION OF THE PREFERRED EMBODIMENT

Figure 1:
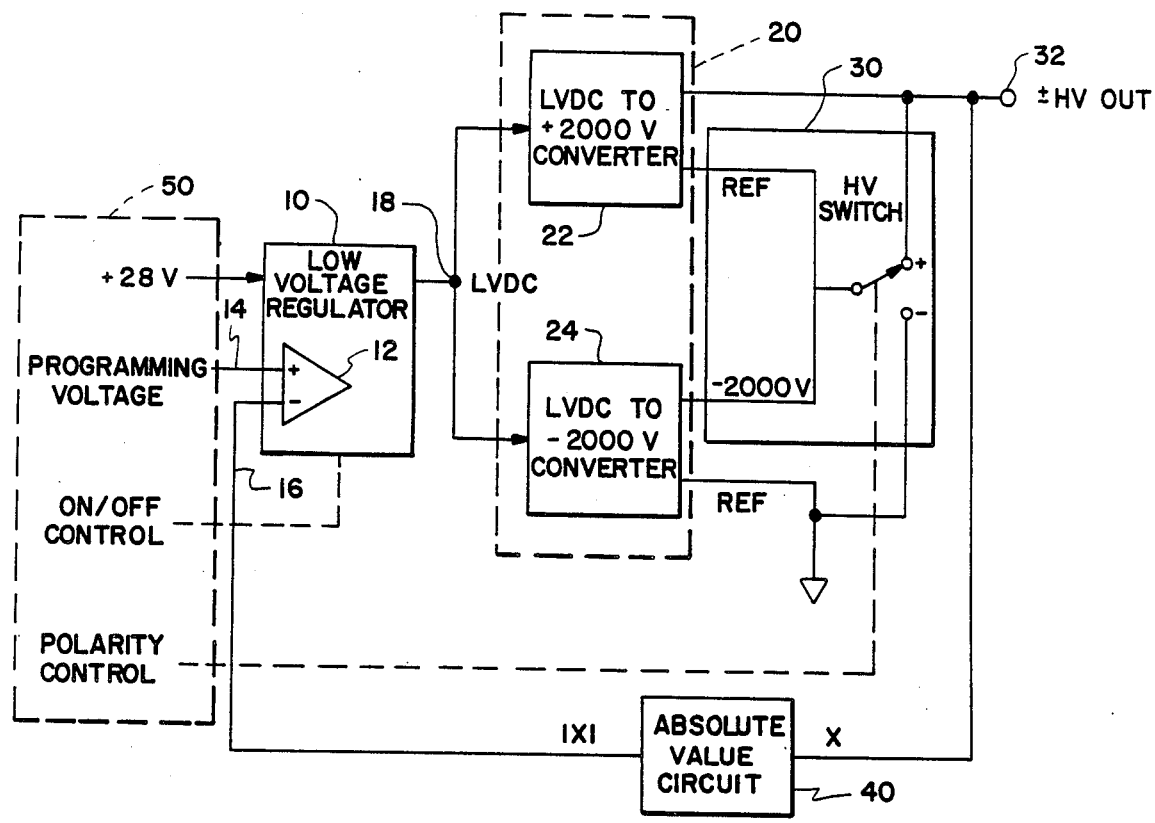
FIG. 1 shows a block diagram of the bipolar power supply of the present invention.

FIG. 1 shows a block diagram of the power supply of the invention. The power supply comprises means for regulating low voltage 10, means for converting low voltage to high voltage 20, means for switching the high voltage output by remote control 30, and means for providing the absolute value of the high voltage output 40. Mean for generating control signals for the low voltage regulator means 10 the low voltage to high voltage conversion means 20, and the high voltage switching means 30 are illustrated by the dotted-line box 50. The external power requirements of the power supply may also advantageously be included as part of the circuitry comprising control generating means 50.

The power supply shown in FIG. 1 functions as a bipolar power supply in the manner detailed below. The low voltage regulator means 10 includes a comparator 12 which has a programming input 14 and a feedback input 16. In one embodiment of the device built by Honeywell Inc., Minneapolis, Minnesota, the programming voltage input was scaled to provide a low voltage output signal of about 400 volts per volt programming constant where the programming constant ranged from about 2.25 to about 5.25 volts input. This finally resulted in an output range for the power supply of about 900 volts to about 2100 volts. The low voltage regulator means in the Honeywell example compared the programming voltage input to a scaled down high voltage level (approximately 1/400th of the actual output voltage) which was provided by the absolute value means 40 to input 16. The low voltage regulator output at node 18 was automatically adjusted such that the scaled down high voltage was equal to the programming voltage input.

The low voltage conversion means 20 includes means for converting low voltage dc to a negative polarity high voltage dc 24 and means for converting low voltage dc to a positive polarity high voltage dc 22. Each of the low voltage conversion means 22 and 24 further comprises an inverter which initially chops the low voltage dc and passes it through a means for stepping up the voltage signal generated by the inverter to about 500 volts. Each low voltage conversion means further includes a voltage quadrupler which increases the output to about 2,000 volts.

The conversion means 22 and 24 are each connected to means for switching the high voltage output 30. High voltage switching mean 30 is remotely controlled by polarity control means which is included in the control signal means 50. Polarity control means is advantageously a CMOS 5 volt logic signal. High voltage switching means 30 operates by shorting either low voltage to high voltage conversion means 22 or 24. Switching means 30 shorts out the converter selected and enables the output of the unshorted converter to appear at the high voltage output terminal 32.

Means for providing the absolute value of the high voltage output 40 is also connected to output 32. The absolute value means scales down the high voltage output and generates the absolute feedback voltage to input 16 of the low voltage regulator means. In one embodiment of the invention, a voltage divider network was employed to scale down the high voltage output of either polarity and the scaled down signal was fed into the input of absolute value means 40.

Figure 2:
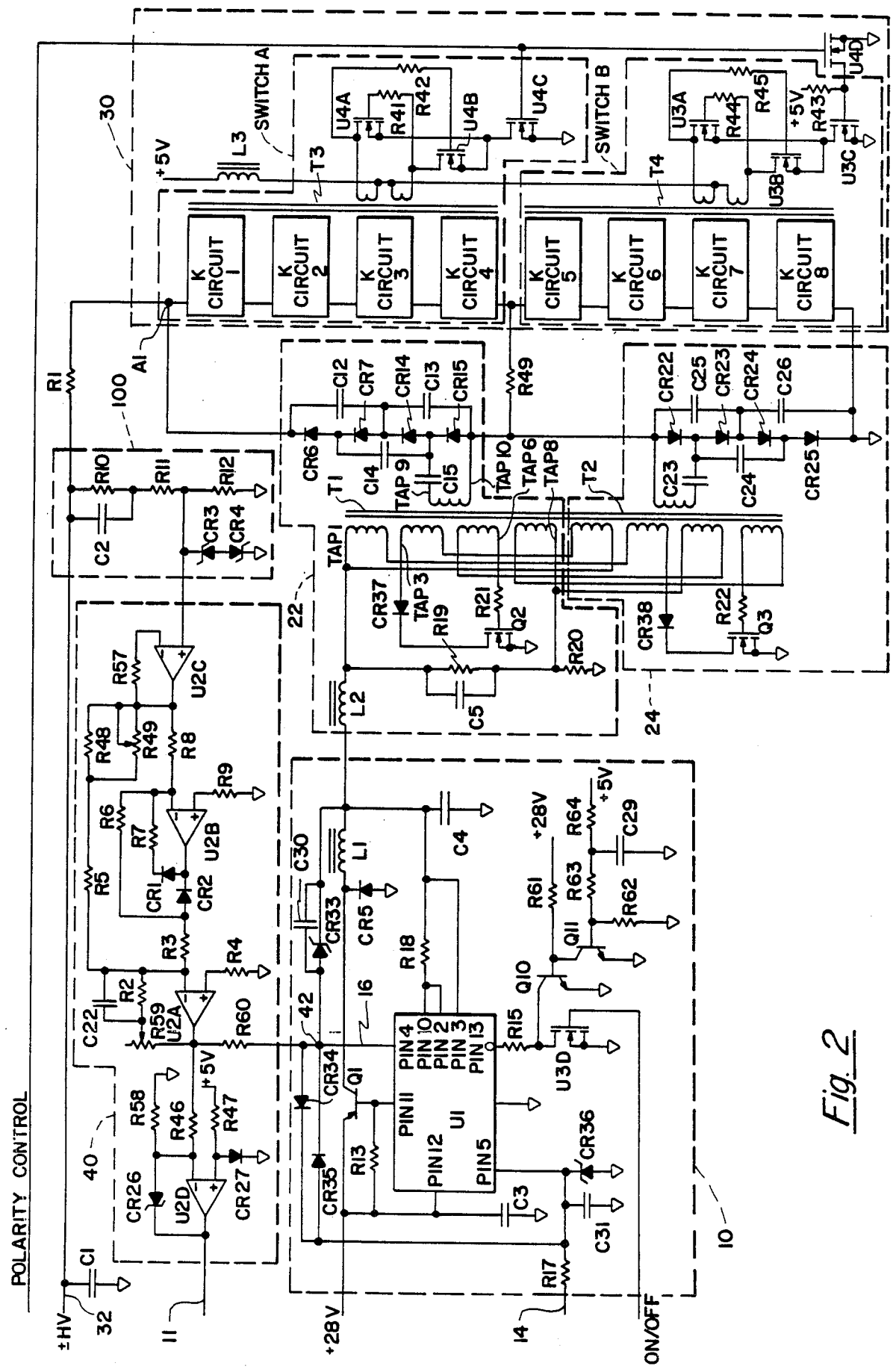
FIG. 2 shows a detailed schematic of one embodiment of the bipolar power supply of the present invention.

Referring now to FIG. 2, one embodiment of a power supply of the present invention is illustrated in detail. The low voltage regulator means is designated by dotted line 10. Low voltage regulator means 10 includes microcircuit U1 which is suitably a large scale integrated voltage regulator circuit. In one example of the invention as built by Honeywell Inc. a model voltage regulator which is commonly available was employed to function as U1. Further included in low voltage regulator means 10 are first through fifth capacitors C3, C4, C29, C30, and C31, first through eighth resistors R13, R15, R17, R18, and R61-64, first through fifth diodes CR5, and CR33-36, first through fourth transistors Q1, Q10, Q11, and U3D, and a first inductor L1.

Pin 5 of microcircuit U1 corresponds to the non-inverting reference input 14 and is connected through resistor R17 to the programming voltage input. Also connected to U1 pin 5 are a first terminal of capacitor C31, the cathode of diode CR36, the cathode of diode CR34 and the anode of diode CR35. Diodes CR34 and CR35 are advantageously included to provide protection for the differential inputs 14 and 16 (at pins 5 and 4 respectively) of microcircuit U1. Pin 12 of U1 is connected to a first terminal of capacitor C3, a first terminal of resistor R13 and an external voltage generating means supply about +28 volts dc. Also connected to the external +28 volt generating means is the emitter of transistor Q1. The base of transistor Q1 is connected to a second terminal of R13 and to pin 11 of U1. The collector of Q1 is connected to the cathode of CR5 and a first terminal of inductor L1. Pin 4 of U1 corresponds to inverting input 16 and is connected to the anodes of CR33 and 34, the cathode of CR35 and a first terminal of capacitor C30. Pins 10 and 2 of U1 are coupled together and connected to a first terminal of R18. Pin 3 of U1 is connected to a second terminal of R18 and also to a first terminal of C4. A second terminal of L1 is connected to the first terminal of C4 and a second terminal of C30. Pin 13 of U1 is connected to a first terminal of R15. The second terminal of R15 is connected to the drain of transistor U3D. The gate and source of transistor U3D are tied to ground. The gate of transistor U3D is connected to the remote switching means which provides the on/off control for the voltage regulator means 10. In the example of the invention as built by Honeywell Inc., transistor U3D is advantageously a VMOS FET. It will be appreciated by one skilled in the art that several other types of FETs and/or bipolar transistors may be used to perform the functions of U3D. The drain of U3D is also connected to the collector of transistor Q10. The base of Q10 is connected to a first terminal of resistor R61 and the collector of transistor Q11. A second terminal of transistor R61 is connected to the +28 volt generating means. The base of transistor Q11 is connected to a first terminal of resistor R62 and a first terminal of resistor R63. A second terminal of R63 is connected to a first terminal of resistor R64 and a first terminal of capacitor C29. Resistors R61-64, capacitor C29 and transistors Q10 and Q11 are connected in a pattern suitable to provide an electrical interlock that prevents operation of the low voltage regulator means 10 if a positive 5 volt signal is not present to control switch drivers. In the absence of +5 volt power, the interlock creates a false overload condition to achieve high voltage shutdown. Other grounding and power supply connections are shown in detail in FIG. 2.

Still referring to FIG. 2, low voltage conversion means 22 for converting low voltage dc to a positive polarity high voltage output is illustrated and includes a first transformer T1 sixth through tenth capacitors C5 and C12-C15, ninth through eleventh resistors R19, R20, and R21, sixth through tenth diodes CR6, CR7, CR14, CR15, and CR37, a fifth transistor Q2 and a second inductor L2. A first terminal of inductor L2 is connected to the second terminal of inductor L1. The second terminal of inductor L2 is connected to a first terminal of each of R19, C5, and tap 1 of transformer T1. The second terminals of R19 and C5 are connected to a first terminal of R20 and tap 8 of transformer T1. The anode of diode CR37 is connected to tap 3 of transformer T1. The cathode of diode CR37 is connected to the drain of FET Q2. The gate of FET Q2 is connected to a first terminal of resistor R21. A second terminal of resistor R21 is connected to tap 6 of transformer T1. The primary winding of transformer T1 advantageously includes a plurality of taps suitable for stepping up the input voltage when coupled with the secondary winding. The secondary winding of transformer T1 is advantageously a 1000 turn coil which includes taps 9 and 10 of transformer T1. Tap 9 is connected to a first terminal of capacitor C15. A second terminal of capacitor C15 is connected to the cathode of diode CR15, the anode of diode CR14 and a first terminal of capacitor C14. A second terminal of capacitor C14 is connected to the cathode of diode CR7 and the anode of diode CR6. The cathode of diode CR6 is connected to a first terminal of capacitor C12. A second terminal of capacitor C12 is connected to a first terminal of C13, the cathode of diode CR14 and the anode of diode CR7. Finally, a second terminal of capacitor C13 is connected to tap 10 of transformer T1 and the anode of diode CR15.

Similarly, low voltage conversion means 24 for providing negative polarity high voltage power includes a second transformer T2, eleventh through fourteenth capacitors C23 through C26, a twelfth resistor R22, eleventh through fifteenth diodes CR22 through CR25 and CR38, and transistor Q3. The aforesaid elements of low voltage conversion means 24 are connected as shown in FIG. 2 in a configuration similar to that described above for low voltage conversion means 22 with appropriate changes made in the polarity of the elements in order to provide a negative polarity high voltage output.

Both low voltage conversion means 22 and 24 use VMOS FETs (Q2 and Q3) which are connected in an inverter configuration for "chopping" the low voltage dc output from low voltage regulator means 10 and passing it through the transformers T1 and T2. Transformers T1 and T2 are advantageously a pair of tape wound core transformers which step up the voltage to 500 volts nominal. The material comprising the cores of the transformers is most preferrably Permalloy, but may advantageously be Orthonal or ferrite. Diodes CR6, CR7, CR14, CR15, and CR37 and diodes CR22, CR23, CR24, and CR26 together with the related capacitors for each of these groups of diodes each are connected in a pattern suitable for approximately quadrupling the voltage output of the transformers T1 and T2 respectively. Thus, in the case of one embodiment of the invention built by Honeywell Inc., the voltage was increased from about 500 volts to about 2,000 volts. The low voltage conversion means 22 and 24 are connected back to back so that either polarity can be obtained at the output 32 by shorting out the undesired voltage. Resistor R49 acts as a current limiter for the shorted conversion means. FIG. 2 shows that the primary windings of transformers T1 and T2 are connected in series; thus, the inverter will always have a high impedance load, even though one of the transformers is short circuited.

Still referring to FIG. 2, a detailed drawing of high voltage switching means 30 is shown within the dotted-line box 30. The high voltage switching means 30 includes switch A and switch B which further include first through eighth K circuits, a third inductor L3, third and fourth transformers T3 and T4, thirteenth through seventeenth resistor R41 through R45 and seventh through thirteenth transistors U3A, U3B, U3C, and U4A through U4D. The eight K circuits are described in more detail below with reference to FIG. 3.

A first switching transistor group U4A, U4B, and U4C and a second transistor switching group U3A, U3B, and U3C are each connected in series. Each transistor group is further connected to an excitation transformer, T3 and T4 respectively, which are in turn connected in parallel with a voltage divider network such that the voltage drop across each transistor is approximately equal. In one example of the invention, the voltage drop across each of the switching group transistors was about 500 volts. The polarity is switched by actuating one of the transistor switching groups. The switching groups are actuated by enabling an inverter in the primary of its excitation transformer by means of applying a logic signal on the polarity input to the power supply of 0 or 5 volts dc. The two transistor switching groups are interlocked through interlock transistor U4D such that only one switching group can be enabled at a time, thus insuring that only one of the high voltage polarity switches is turned on at any given time. The transistors comprising the transistor switching groups can advantageously be VMOS FETs or NPN transistors with voltage ratings of 500 volts or more or equivalent circuit elements. Both switch A and switch B are driven by +5 volt dc which is introduced to the circuits through inductor L3.

Also shown in FIG. 2 dotted line form is voltage divider means 100 including overvoltage protection which is comprised of eighteenth through twentieth resistors R10, R11, and R12, sixteenth and seventeenth diodes CR3 and CR4 and a fifteenth capacitor C2. Also shown in close relation to voltage divider means 100 are resistor R1 and capacitor C1 which act as a ripple filter for the power supply. A first terminal of resistor R1 is connected to output 32. A second terminal of resistor R1 is connected to output 32, a first terminal of resistor R10 and a first terminal of capacitor C2. A second terminal of resistor R10 is connected to a first terminal of resistor R11 and a second terminal of capacitor C2. A second terminal of resistor R11 is connected to a first terminal of resistor R12. The voltage divider means 100 scales down the high voltage output from the high voltage switching means 30 and applies the scaled down signal to the absolute value generating means 40.

Still referring to FIG. 2, the absolute value generating means 40 is shown within the dotted-line box labelled 40. The absolute value generating means 40 includes first through fourth operational amplifiers U2A through U2D, a sixteenth capacitor C22, twenty-first through thirty-sixth resistor R2 through R9, R46 through R49, and R57 through R60, and eighteenth through twenty-first diodes CR1, CR2, CR26, and CR27. A first input of operational amplifier U2C is connected between resistors R11 and R12 and to the cathode of diode CR3. Diodes CR3 and CR4 have their anodes coupled together and provide overvoltage protection for the first input. Feedback resistor R57 is connected between a second input and the output of operational amplifier U2C. The output of U2C is further connected to a first terminal of variable resistor R49, a first terminal of resistor R48, and a first terminal of resistor R8. A second terminal of resistor R8 is connected to a first input of operational amplifier U2B, a first terminal of resistor R7, and a first terminal of resistor R6. A second terminal of resistor R7 is connected to the cathode of diode CR1. The anode of diode CR1 is connected to the cathode of diode CR2 and to the output of operational amplifier U2B. A second input of operational amplifier U2B is connected to a first terminal of resistor R9. The anode of diode CR2 is connected to a second terminal of resistor R6 and a first terminal of resistor R3. A second terminal of resistor R49 and a second terminal of resistor R48 are connected to a first terminal of resistor R5. A second terminal of resistor R5 is connected to first terminals of capacitor C22 and resistor R2 and a second terminal of resistor R3 as well as to a first input of operational amplifier U2A. A second input of operational amplifier U2A is connected to a first terminal of resistor R4. The output of operational amplifier U2A is connected to a first terminal of variable resistor R59. A second terminal of capacitor C22 and a second terminal of resistor R2 is connected to the tap of variable resistor R59. The output of amplifier U2A is fed through resistor R60 to the inverting input 16 of the low voltage regulator means 10. The output of amplifier U2A is also connected through the circuit comprising operational amplifier U2D, resistors R46, R47, and R58, and diodes CR26 and CR27 which are suitably connected in a pattern to provide signal conditioning for feedback to the control signal means 50 at node 11.

Figure 3:
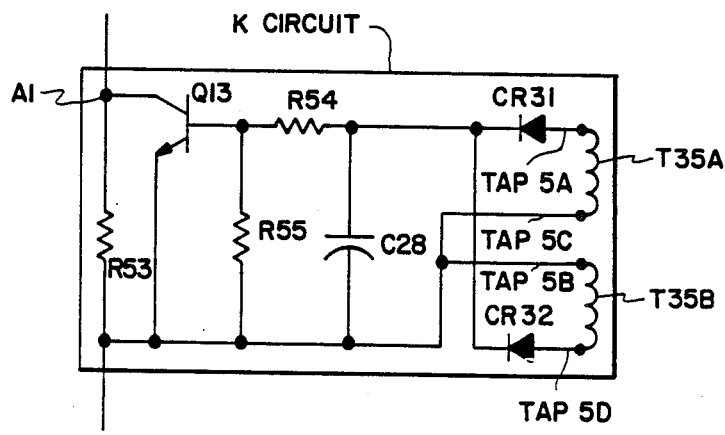
FIG. 3 shows a detailed schematic of one of the circuits which is included in the high voltage switch of the invention.

Referring now to FIG. 3, a detailed circuit diagram of circuit K is shown. Circuit K comprises a transistor Q13, resistors R53, R54, and R55, capacitor C28, diodes CR31 and CR32, and transformer windings T35A and T35B. The collector of transistor Q13 is connected to a first terminal of resistor R53. The base of transistor Q13 is connected to a first terminal of R54 and a first terminal of R55. The emitter of transistor Q13 is connected to a second terminal of resistor R55 and R53 as well as a second terminal of capacitor C28. A first terminal of capacitor C28 is connected to a second terminal of resistor R54 which is further connected to the cathodes of diodes CR31 and CR32. The anodes of diode CR31 is connected to tap 5A of transformer winding T35A and the anode of diode CR32 is connected to tap 5D of transistor coil T35B. Tap 5C of transformer winding T35A and tap 5B of transformer winding T35B are connected together at the node joining the emitter of Q13 with the second terminals of R53 and R55 as well as the first terminal of capacitor C28. K circuit 1 is connected at node A1 at the collector of the transistor Q13.

Referring now to FIG. 2, the K circuits are connected such that in K circuits 1 through 4, the emitter of the transistor Q13 in K circuit 1 is connected to the collector of the transistor corresponding to Q13 in the K circuit 2 and so on through K circuits 1 through 4. K circuits 5 through 8 are connected in a mirror image relationship to K circuits 1 through 4. Therefore, the emitter of the transistor corresponding to Q13 in K circuit 4 is connected to the emitter of the transistor K circuit 5 and so on through K circuit 8.

While there has been shown and described a preferred embodiment of the invention, those skilled in the art will appreciate that various changes and modifications may be made to the illustrated embodiment without departing from the true spirit and scope of the invention which is to be determined from the appended claims.

The embodiments of an invention in which an exclusive property or right is claimed are defined as follows:

1. A power supply having a high voltage output comprising:
   means for regulating low voltage including a comparator having a programming voltage input and a feedback voltage input, the low voltage regulating means also having a low voltage output;
   means for converting low voltage dc to a negative polarity high voltage dc proportional to the electronic signal applied to the programming input and having an input connected to the low voltage output;
   means for converting low voltage dc to a positive polarity high voltage dc proportional to the electronic signal applied to the programming input and having an input connected to the low voltage output;
   means for switching the high voltage output by remote control such that in a first switching mode the high voltage output is derived from the output of the positive polarity conversion means, and in a second switching mode the high voltage output is derived from the output of the negative polarity conversion means; and
   means for providing the absolute value of the high voltage output including an input, an output and further including scaling means such that a scaled down absolute value of the signal present at the high voltage output is fed into the feedback voltage input of the low voltage regulator means.

2. The apparatus of claim 1 wherein the voltage regulator comprises:
   means for comparing the electronic signal applied to the programming voltage input to the signal present at the feedback voltage input;
   means for automatically adjusting the low voltage regulator means output such that the signal present at the feedback voltage input is equal to the signal applied to the programming voltage input; and
   means for creating a false overload mode condition to achieve high voltage shutdown.

3. The apparatus of claim 2 wherein the positive and negative polarity low voltage conversion means each comprise:
   first and second VMOS FETs connected in an inverter configuration to the low voltage output such that the signal present at the low voltage output is chopped;
   first through fourth means for receiving and stepping up the chopped output of the VMOS FETs to about 500 volts; and
   means for quadrupling the voltage output by the first through fourth step-up means.

4. The apparatus of claim 3 wherein the positive and negative polarity low voltage conversion means each additionally comprise:
   means for connecting the low voltage conversion means in a back-to-back configuration such that either output polarity is obtained by shorting out the undesired voltage.

5. The apparatus of claim 4 wherein the high voltage switching means comprises two circuits, each of which includes:
   first, second, third, and fourth transistors connected in series;
   an excitation transformer;
   a voltage divider network connected in parallel with the excitation transformer and also connected to the first, second, third, and fourth transistors such that the voltage drop across each transistor is approximately equal.

6. The apparatus of claim 5 wherein the voltage drop across each of the first, second, third, and fourth transistors is about 500 volts.

7. The apparatus of claim 6 wherein the absolute value means is connected to the high voltage output through a voltage divider, and wherein the absolute value means applies a feedback signal on the reference voltage input of the low voltage regulating means which is scaled down to 1/400th of the high voltage output.

8. The apparatus of claim 7 wherein:
   the positive polarity high voltage conversion means is adjustable in the range of about +900 volts to about +2,100 volts; and
   the negative polarity high voltage conversion means is adjustable in the range of about −900 volts to about −2,100 volts.

9. A bipolar power supply system having a high voltage output comprising:
   means for regulating low voltage including a comparator having a programming voltage input and a feedback voltage input, the low voltage regulating means also having a low voltage output;
   means for converting low voltage dc to a negative polarity high voltage dc proportional to the electronic signal applied to the programming input and having an input connected to the low voltage output;
   means for converting low voltage dc to a positive polarity high voltage dc proportional to the electronic signal applied to the programming input and having an input connected to the low voltage output;
   means for switching the high voltage output by remote control such that in a first switching mode the high voltage output is derived from the output of the positive polarity conversion means, and in a second switching mode the high voltage output is derived from the output of the negative polarity conversion means;
   means for providing the absolute value of the high voltage output including an input, an output and further including scaling means such that a scaled down absolute value of the signal present at the high voltage output is fed into the feedback voltage input of the low voltage regulator means; and means for generating control signals for the low voltage means, high voltage switching means and each of the low voltage conversion means.

10. The apparatus of claim 9 wherein the voltage regulator comprises:

means for comparing the electronic signal applied to the programming voltage input to the signal present at the feedback voltage input;

means for automatically adjusting the low voltage regulator means output such that the signal present at the feedback voltage input is equal to the signal applied to the programming voltage input; and means for creating a false overload mode condition to achieve high voltage shutdown.

11. The apparatus of claim 10 wherein the positive and negative polarity low voltage conversion means each comprise:

first and second VMOS FETs connected in an inverter configuration to the low voltage output such that the signal present at the low voltage output is chopped;

first through fourth means for receiving and stepping up the chopped output of the VMOS FETs to about 500 volts; and means for quadrupling the voltage output by the first through fourth step-up means.

12. The apparatus of claim 11 wherein the positive and negative polarity low voltage conversion means each additionally comprise:

means for connecting the low voltage conversion means in a back-to-back configuration such that either output polarity is obtained by shorting out the undesired voltage.

13. The apparatus of claim 12 wherein the high voltage switching means comprises two circuits, each of which includes:

first, second, third, and fourth transistors connected in series;

an excitation transformer;

a voltage divider network connected in parallel with the excitation transformer and als connected to the first, second, third, and fourth transistors such that the voltage drop across each transistor is approximately equal.

14. The apparatus of claim 13 wherein the voltage drop across each of the first, second, third, and fourth transistors is about 500 volts.

15. The apparatus of claim 14 wherein the absolute value means is connected to the high voltage output through a voltage divider, and wherein the absolute value means applies a feedback signal on the reference voltage input of the low voltage regulating means which is scaled down to 1/400th of the high voltage output.

16. The apparatus of claim 19 wherein:

the positive polarity high voltage conversion means is adjustable in the range of about +900 volts to about +2,100 volts; and the negative polarity high voltage conversion means is adjustable in the range of about −900 volts to about −2,100 volts.

* * * * *